(12) United States Patent
Jaudon et al.

(10) Patent No.: US 9,009,262 B2
(45) Date of Patent: Apr. 14, 2015

(54) DEVICE COLLABORATION IN A VIRTUAL SESSION

(71) Applicant: Aventura HQ, Inc., Denver, CO (US)

(72) Inventors: Joe Jaudon, Sedalia, CO (US); David Lowrey, Denver, CO (US); Adam Williams, Aurora, CO (US)

(73) Assignee: Aventura HQ, Inc., Denver, CO (US)

( * ) Notice: Subject to any disclaimer, the term of this patent is extended or adjusted under 35 U.S.C. 154(b) by 0 days.

(21) Appl. No.: 13/787,256

(22) Filed: Mar. 6, 2013

(65) Prior Publication Data

US 2014/0012892 A1    Jan. 9, 2014

Related U.S. Application Data

(60) Provisional application No. 61/667,759, filed on Jul. 3, 2012.

(51) Int. Cl.
*G06F 15/16* (2006.01)
*G06F 15/173* (2006.01)
*H04L 29/08* (2006.01)
*H04L 29/06* (2006.01)

(52) U.S. Cl.
CPC .............. *H04L 67/10* (2013.01); *H04L 67/141* (2013.01); *H04L 67/38* (2013.01)

(58) Field of Classification Search
CPC ... G06F 21/31; H04L 63/08; H04N 21/25875
See application file for complete search history.

(56) References Cited

U.S. PATENT DOCUMENTS

| 5,572,528 | A  | * | 11/1996 | Shuen         | 370/402 |
|-----------|----|---|---------|---------------|---------|
| 7,085,805 | B1 | * | 8/2006  | Ruberg et al. | 709/203 |
| 2010/0088397 | A1 | * | 4/2010 | Jaudon et al. | 709/220 |
| 2011/0083081 | A1 | * | 4/2011 | Jaudon et al. | 715/743 |
| 2012/0089666 | A1 | * | 4/2012 | Goswami et al. | 709/203 |
| 2012/0311038 | A1 | * | 12/2012 | Trinh et al.  | 709/204 |

* cited by examiner

*Primary Examiner* — Peling Shaw
(74) *Attorney, Agent, or Firm* — Holland & Hart LLP

(57) ABSTRACT

Methods, systems, and devices are described for using a central server computer system disposed to dynamically manage collaboration between terminal devices and peripheral devices during a virtual session. The central server computer system may associate a peripheral device with a virtual session hosted by a host device. The virtual session may be further associated with a terminal device communicatively coupled with the central server computer system. The central server computer system may establish a connection between the central server computer system and the peripheral device; forward peripheral data between the peripheral device and the host device such that the virtual session perceives the peripheral device as locally connected to the host device; and forward user interface data associated with the virtual session between the host device and the terminal device.

24 Claims, 14 Drawing Sheets

DEVICE COLLABORATION IN A VIRTUAL SESSION

CROSS-REFERENCE TO RELATED APPLICATION

The present application claims priority to U.S. Provisional Application Ser. No. 61/667,759, entitled "TERMINAL DEVICE COLLABORATION IN A VIRTUAL SESSION," which was filed on Jul. 3, 2012 and is incorporated by reference herein for all purposes.

BACKGROUND

The present invention relates to computer network communication, and more particularly, to centrally managed collaboration among multiple terminal devices during a virtual session.

Various computer systems may use a thin-client or a virtual desktop display in conjunction with a centralized server computer system or mainframe. Virtualization is a logical representation of a computer in software. By decoupling the physical hardware from aspects of operation, virtualization may provide more operational flexibility and increase the utilization rate of the underlying physical hardware. Although virtualization is implemented primarily in software, many modern microprocessors now include hardware features explicitly designed to improve the efficiency of the virtualization process.

During a virtual session, a certain amount of computing functionality may be performed at a host computer on behalf of a user connected to a terminal device. Input/output (I/O) functionality for the virtual session may be exchanged between the terminal device and the host computer. However, in many instances, users may have access to different terminal devices or other peripheral devices at different times. These different peripheral devices may offer heterogeneous sets of capabilities and functionalities. There is a need, therefore, for systems and methods allowing a user to dynamically collaborate among multiple devices in a virtual session.

SUMMARY

Methods, systems, and devices are described for using a central network device disposed between a host device and a number of terminal devices to dynamically manage collaboration among terminal devices and peripheral devices during a virtual session.

According to a first set of illustrative examples, a system for managing virtual sessions may include: a peripheral device configured to transmit or receive peripheral data, a terminal device, a host device configured to host a virtual session associated with the terminal device, and a central server computer system communicatively coupled with the peripheral device, the terminal device, and the host device. The central server computer system may be configured to: associate the peripheral device with the virtual session hosted by a host device; establish a connection between the central server computer system and the peripheral device; forward peripheral data between the peripheral device and the host device such that the virtual session perceives the peripheral device as locally connected to the host device; and forward user interface data associated with the virtual session between the host device and the terminal device.

In certain examples, the terminal device may be a first terminal device, and the central server computer system may be further configured to: detect a movement of a user from the first terminal device to a second terminal device communicatively coupled with the central server computer system; and begin forwarding the user interface data associated with the virtual session between the host device and the second terminal device based on the detected movement of the user. The central server computer system may be further configured to discontinue the forwarding of user interface data associated with the virtual session between the host device and the first terminal device based on a logout event received from the first terminal device. In certain examples, the central server computer system may be further configured to continue forwarding the peripheral data between the peripheral device and the host device following the logout event and prior to receiving a login event from the second terminal device.

According to a second set of illustrative embodiments, a method of managing virtual sessions may include associating, at a central server computer system, a peripheral device with a virtual session hosted by a host device, the virtual session being further associated with a terminal device communicatively coupled with the central server computer system; establishing a connection between the central server computer system and the peripheral device; forwarding peripheral data at the central server computer system between the peripheral device and the host device such that the virtual session perceives the peripheral device as locally connected to the host device; and forwarding user interface data associated with the virtual session between the host device and the terminal device.

In certain examples, the terminal device may be a first terminal device, and the central server computer system may detect a movement of a user from the first terminal device to a second terminal device communicatively coupled with the central server computer system. The central server computer system may then begin forwarding the user interface data associated with the virtual session between the host device and the second terminal device based on the detected movement of the user. The central server computer system may also discontinue the forwarding of user interface data associated with the virtual session between the host device and the first terminal device based on a logout event received from the first terminal device. In certain examples, the central server computer system may continue forwarding the peripheral data between the peripheral device and the host device following the logout event and prior to receiving a login event from the second terminal device. The central server computer system may continue to forward the peripheral data between the peripheral device and the host device following the logout event and prior to receiving a login event from the second terminal device.

In certain examples, the central server computer system may receive a request to associate the peripheral device with the virtual session, and the forwarding of the peripheral data between the peripheral device and the host device may occur in response to the request. The request may be received at the central server computer system from the terminal device.

In certain examples, the forwarding of the user interface data associated with the virtual session between the central server computer system and the terminal device may occur over a first network, and the forwarding the peripheral data between the central server computer and the peripheral device may occur over at least a separate second network.

In certain examples, the central server computer system may authenticate the user of the peripheral device at the central server computer system, and the forwarding of the peripheral data between the peripheral device and the host device may occur in response to the authentication.

In certain examples, the establishment of the connection between the central server computer system and the peripheral device may include communicating at the central server computer system with a second terminal device having a local connection to the peripheral device. Additionally or alternatively, the communication between the central server computer system and the peripheral device may occur directly over the network. In certain examples, the user interface data may be at least partially based on the peripheral data.

According to a third set of illustrative embodiments, a central server computer system may include a peripheral device association module configured to associate a peripheral device with a virtual session hosted by a host device, the virtual session being further associated with a terminal device communicatively coupled with the central server computer system; a peripheral device connection module configured to establish a connection between the central server computer system and the peripheral device; and a switching module configured to forward peripheral data between the peripheral device and the host device, such that the virtual session perceives the peripheral device as locally connected to the host device, and forward user interface data associated with the virtual session between the host device and the terminal device, the user interface data based at least in part on the peripheral data.

Each of the illustrative embodiments described in the present summary may be configured to implement one or more aspects of the functionality described above with respect to the other illustrative embodiments.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
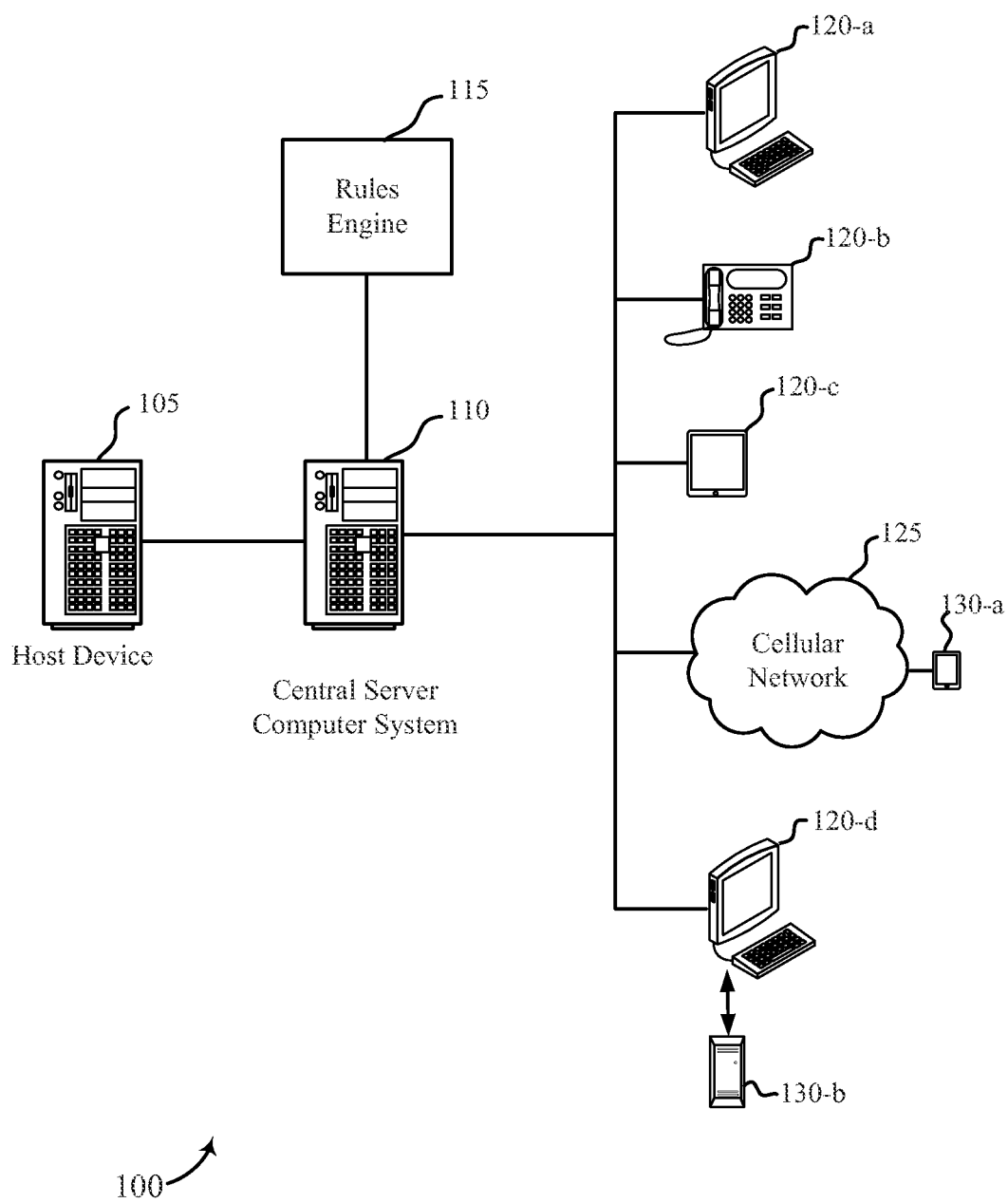
FIG. 1 is a block diagram of an example system including components configured according to various embodiments of the invention.

Methods, systems, and devices are disclosed for using a central server computer system to dynamically manage collaboration among terminal and peripheral devices during a virtual session. The central server computer system may route user interface data between a host device hosting a virtual session and a terminal device associated with that virtual session. The central server computer system may select or receive a selection of a peripheral device, separate from the terminal device, for association with the virtual session. The central server computer system may connect to the selected peripheral device over a network and forward peripheral data for the virtual session between the peripheral device and the host device such that the virtual session perceives the peripheral device as locally connected to the host device.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

As used herein, the term "virtual session" or "session" refers to a hosted session of a virtual computing environment associated with a particular user that may be accessed from one or more client devices other than the host. For example, a session may include a thin client session, a virtual application session, a virtual machine session, a virtual operating system session, and/or the like. As used herein, a session described as being "between" a host device and a terminal device refers to the exchange of data between the host device and the terminal device, where the data is related to the session hosted at the host device.

As used herein, the term "terminal device" refers to a device configured to provide a primary component of a user interface for a remotely hosted virtual session to a user associated with the virtual session.

As used herein, the term "peripheral device" refers to an input/output (I/O) device accessible to a central server computer system over a network to provide I/O data for a remotely hosted virtual session. The term "peripheral device" may also refer generally to a terminal device or other device that makes an I/O component available to the central server computer system via the network.

FIG. 1 illustrates an example of a system 100 including host devices 105, a central server computer system 110, a rules engine 115, terminal devices 120 (e.g., workstation 120-a, Internet Protocol (IP) telephone 120-b, tablet 120-c, workstation 120-d), and peripheral devices 130 (e.g., smartphone 130-a, access card reader 130-b). It will be understood that other types of terminal devices 120 and peripheral devices 130 may be used. Each of these components may be in communication with each other, directly or indirectly.

In the system 100 of FIG. 1, the central server computer system 110 may be communicatively coupled with a number of host devices 105, the terminal devices 120, and the peripheral devices 130. In the present example, the central server computer system 110 may be communicatively coupled with the terminal devices 120 through a local network, the smartphone peripheral device 130-a through a cellular network 125 and the local network, and the access card reader peripheral device 130-b through terminal device 120-d. The central server computer system 110 may be configured to forward user interface information (e.g., as network packets) between the host devices 105 and the terminal devices 120. In certain examples, the central server computer system 110 may perform layer-3 switching (i.e., routing) and/or layer-2 switching. Additionally or alternatively, the central server computer system 110 may repackage and redirect data received. In certain examples, the central server computer system 110 may be implemented by a server configured to implement switching functionality.

Each of the host devices 105 may be configured to host one or more virtual sessions. In certain examples, each host device 105 may include one or more servers. In certain examples, the central server computer system 110 may implement the functionality of one or more host devices 105.

Each of the virtual sessions may be associated with a particular user. A user may access the user interface of a virtual session hosted by a host device 105 through one of the terminal devices 120. In certain examples, a user may be a person. Alternatively, a user may be a process or a daemon running on one of the terminal devices 120. For example, one of the host devices 105 may host a virtual session for a printing process on a printer terminal device. In certain examples, the terminal device 120 may be a thin client, and the host device 105-a may provide operating system functionality remotely to the terminal device 120, and the terminal device 120 may provide keyboard, video, and mouse (KVM) or other user interface functionality for the session to the user. Alternatively, the terminal device 120 may execute the operating system based on settings provided for the user from the host device 105. In still other examples, the virtual session may include a virtual desktop generated at the host device 105-a, the virtual desktop providing access to virtual applications and applications executed locally at the terminal device 120.

In one embodiment, a user of a terminal device 120 may log onto a system by providing authentication credentials (e.g., username, password, key card, biometric, and/or other credentials) at the terminal device 120. The central server computer system 110 may forward the authentication credentials to a host device 105, which may authenticate the user and provides the terminal device 120 with access to operating system settings, programs, and files associated with the user over the network including the central server computer system 110.

The central server computer system 110 may arbitrate and maintain sessions at the host devices 105 on behalf of users of the terminal devices 120. Thus, when a user logs in to a system by providing authentication credentials at the terminal device 120, the central server computer system 110 may receive the authentication credentials and initiate a session between the host device 105 and the central server computer system on behalf of the user using the authentication credentials. In certain examples, the central server computer system 110 may directly negotiate the session with the host device 105 such that the host device 105 addresses data for the session directly to the switch and is agnostic of the identity of the terminal device 120 associated with the user. Once a session has been established, the central server computer system 110 may forward session data received from the host device 105 to the terminal device 120. Additionally, the central server computer system 110 may forward session data received form the terminal device 120 to the host device 105. Thus, the terminal device 120 may act as though it is directly communicating with the host device 105 to send and receive session data, even though data for the session hosted by the host device 105 is really directed to the central server computer system 110. In certain examples, the session data may include keyboard, video and mouse (KVM) and/or related peripheral input/output data. Additionally or alternatively, the session data may include operating system settings, programs, and/or files associated with the user.

In certain examples, the central server computer system 110 may be configured to keep a session associated with a user active without regard to whether the user is currently logged in to a terminal device 120. When the user is logged in to a terminal device 120, the central server computer system 110 may switch session data between the terminal device 120 and the host device 105. When the user is not logged in to a terminal device 120, the central server computer system 110 may continue communications with the host device 105 to maintain the session. Because sessions hosted by the host devices 105 may be kept active at the central server computer system 110 rather than at the terminal devices 120, there may be no need to initialize a new session each time the user logs onto a different terminal device 120. Rather, the central server computer system 110 may dynamically switch session data for a particular session between different terminal devices 120 according to the movements of the user. Additionally, the fact that the central server computer system 110, rather than the terminal devices 120, maintains the virtual sessions may allow the central server computer system 110 to multiplex session data to multiple terminal devices 120 simultaneously.

The central server computer system 110 may communicate with the rules engine 115 to determine the proper network destination(s) for session data associated with various sessions hosted by the host devices 105. In certain examples, at least a portion of the rules engine 115 may be implemented by or within the central server computer system 110. Additionally or alternatively, at least a portion of the rules engine 115 may be implemented by a device external to the central server computer system 110. The rules engine 115 may apply or enforce a set of event-based rules for multiplexing the session data between the host devices 105 and the terminal devices 120. The events associated with the rules may include, but are not limited to, login events received when a user logs in to a particular terminal device 120, logout or logoff events received when a user logs out or off of a particular terminal device 120, access token events received when a user provides authentication credentials at an access device or terminal device, timer events received based on the passage of time, environmental events triggered by changes in a network, computing, or physical environment, and the like. The central server computer system 110 may selectively forward session data between the host devices 105 and the terminal devices 120 based on the logical deductions of the rules engine 115.

In certain examples, the central server computer system 110 may recognize a particular terminal device 120 as the primary terminal device for a virtual session at the host device 105. Thus, the central server computer system 110 may forward data for a primary component of the user interface for the virtual session between the host device 105 and the primary terminal device 120. For example, if the virtual session includes a virtual desktop, the central server computer system 110 may forward KVM data for the virtual desktop interface to the terminal device 120 associated with the virtual session. A user associated with the virtual session may, however, be able to request that one or more additional peripheral devices 130 be added or removed from association with the virtual session. The peripheral devices may be physically separate from the primary terminal device 120. The additional peripheral device(s) 130 may, for example, be able to provide or receive peripheral data to or from the virtual session at the host device 105 through the central server computer system 110.

The central server computer system 110 may receive a request from a user associated with a virtual session at the host device 105 to dynamically associate a peripheral device 130 with the virtual session, where the peripheral device is separate from the terminal device 120 of the virtual session. In certain examples, the peripheral device 130 may include a number of separate I/O components, and the request may be to associate only a particular input or output stream of the peripheral device with the virtual session. Alternatively, the user may request that the entire peripheral device 130 be associated with the virtual session. As discussed previously, the peripheral device 130 may be one of the other terminal devices 120. Alternatively, the peripheral device 130 may be peripheral device 130 with a standalone connection to the central server computer system 110 or a peripheral device 130 accessible through a terminal device or other device to which the peripheral device 130 is attached.

In response to the request to associate the selected peripheral device 130 with the virtual session, the central server computer system 110 may selectively add or remove an association between the virtual session and the selected peripheral device 130, and update the forwarding of peripheral data for the virtual session between the host device 105 and the peripheral device 130 such that the peripheral device 130 appears to the virtual session as a locally connected peripheral device 130. For example, the host device 105 and the central server computer system 110 may set up a virtual connection to the peripheral device 130 such that the virtual session is unaware that the connection to the peripheral device 130 is virtual, but rather the virtual session treats the peripheral device 130 exactly as if the peripheral device 130 were locally connected to the virtual session.

The central server computer system 110 may track individual users of the system 100 and maintain a dynamically updated record of which terminal devices 120 are available to which users and which terminal devices 120 and peripheral devices 130 are currently associated with which virtual sessions. In certain examples, the central server computer system 110 may associate more than one user or virtual session with a particular terminal device 120 or peripheral device 130. For example, separate virtual sessions may gain access to the same peripheral device 130 through time division multiplexing the I/O streams associated with the peripheral device 130. Additionally or alternatively, one or more terminal devices 120 or peripheral devices 130 may be associated with no virtual session or user. Moreover, at certain times, one or more users may not be associated with any of the terminal devices 120 or peripheral devices 130.

The central server computer system 110 may receive events from the terminal devices 120, peripheral devices 130, and other devices in communication with the central server computer system 110 to dynamically update its records of which terminal devices 120 or peripheral devices 130 are associated with which users and virtual sessions and which terminal devices 120 or peripheral devices 130 are being actively used by the users.

For example, if a first user logs off of workstation 120-a, the central server computer system 110 may receive a logout event from workstation 120-a and disassociate the workstation 120-a from the first user and the virtual session of the first user. If a second user then logs on to workstation 120-a, the central server computer system 110 may receive a login event from workstation 120-a and associate the second user, and the virtual session of the second user, with the workstation 120-a.

In additional or alternative examples, a terminal device 120 may transmit an inactivity event to the central server computer system 110 after a predefined period of inactivity from the user associated with that terminal device 120. Similarly, when the user begins to use the terminal device 120 again after a period of inactivity, the central server computer system 110 may receive an active user event from the terminal device 120.

In additional or alternative examples, the central server computer system 110 may be configured to update its records regarding the state of terminal devices 120 and peripheral devices 130 based on logical deductions and rules. For example, if a login event is received for a user associated with a first workstation terminal device 120 from a second workstation terminal device 120 in a different location, the central server computer system 110 may disassociate the user from the first workstation terminal device 120 or mark the first workstation terminal device 120 as inactive in its association with the user.

Figure 2A:
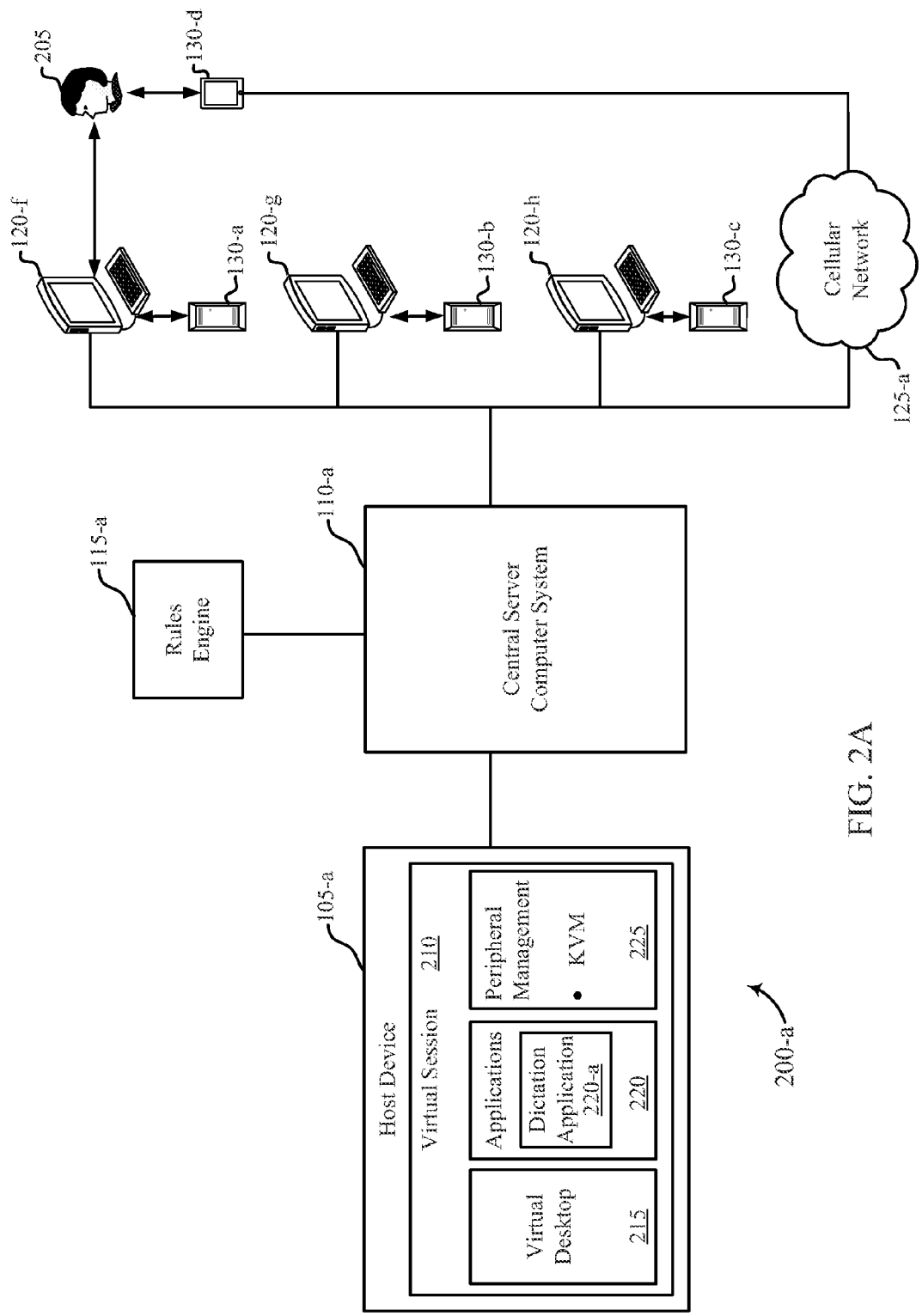
FIGS. 2A-2C are diagrams of an example system including components configured according to various embodiments of the invention at different points in time.
Figure 2B:
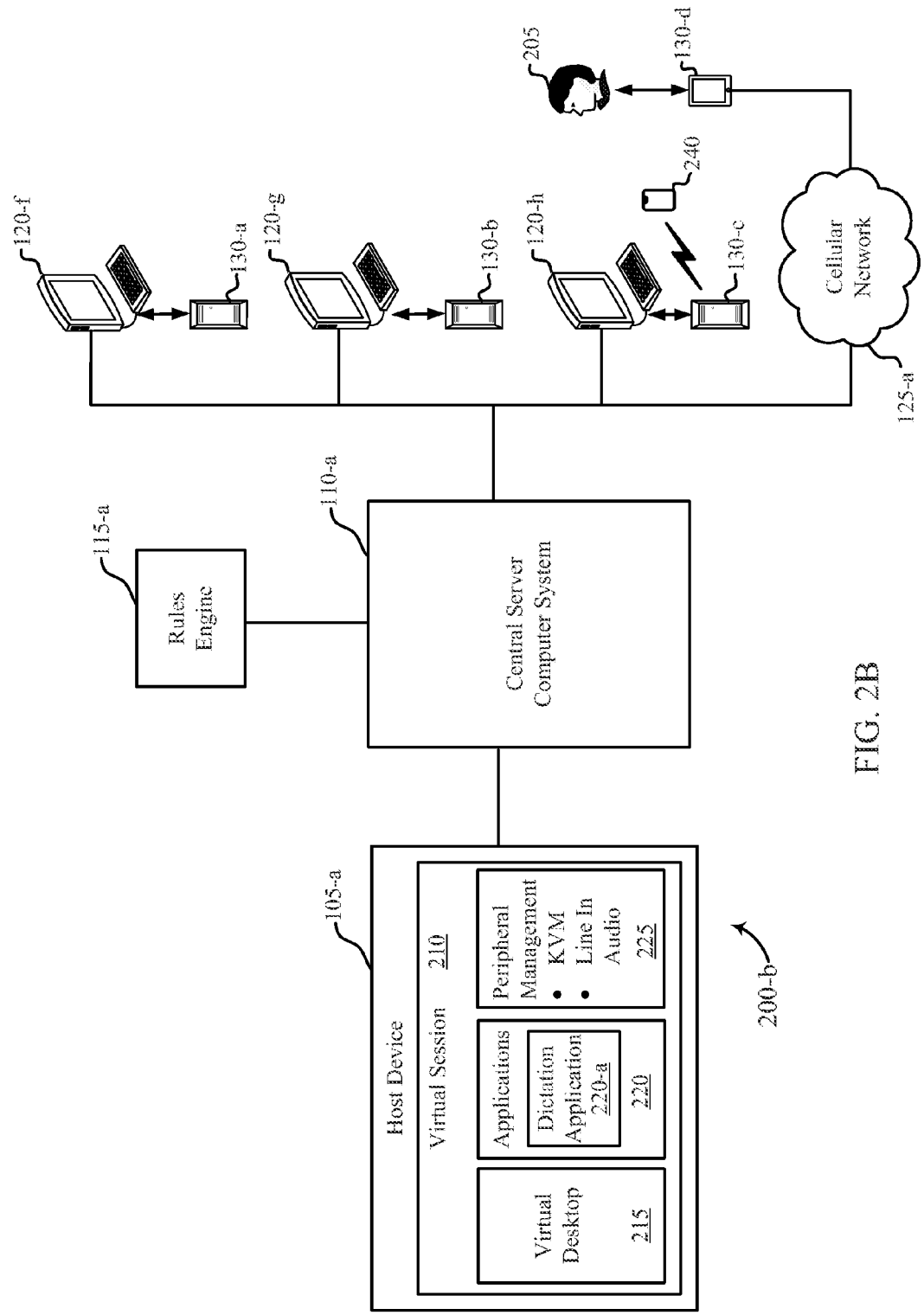
Figure 2C:
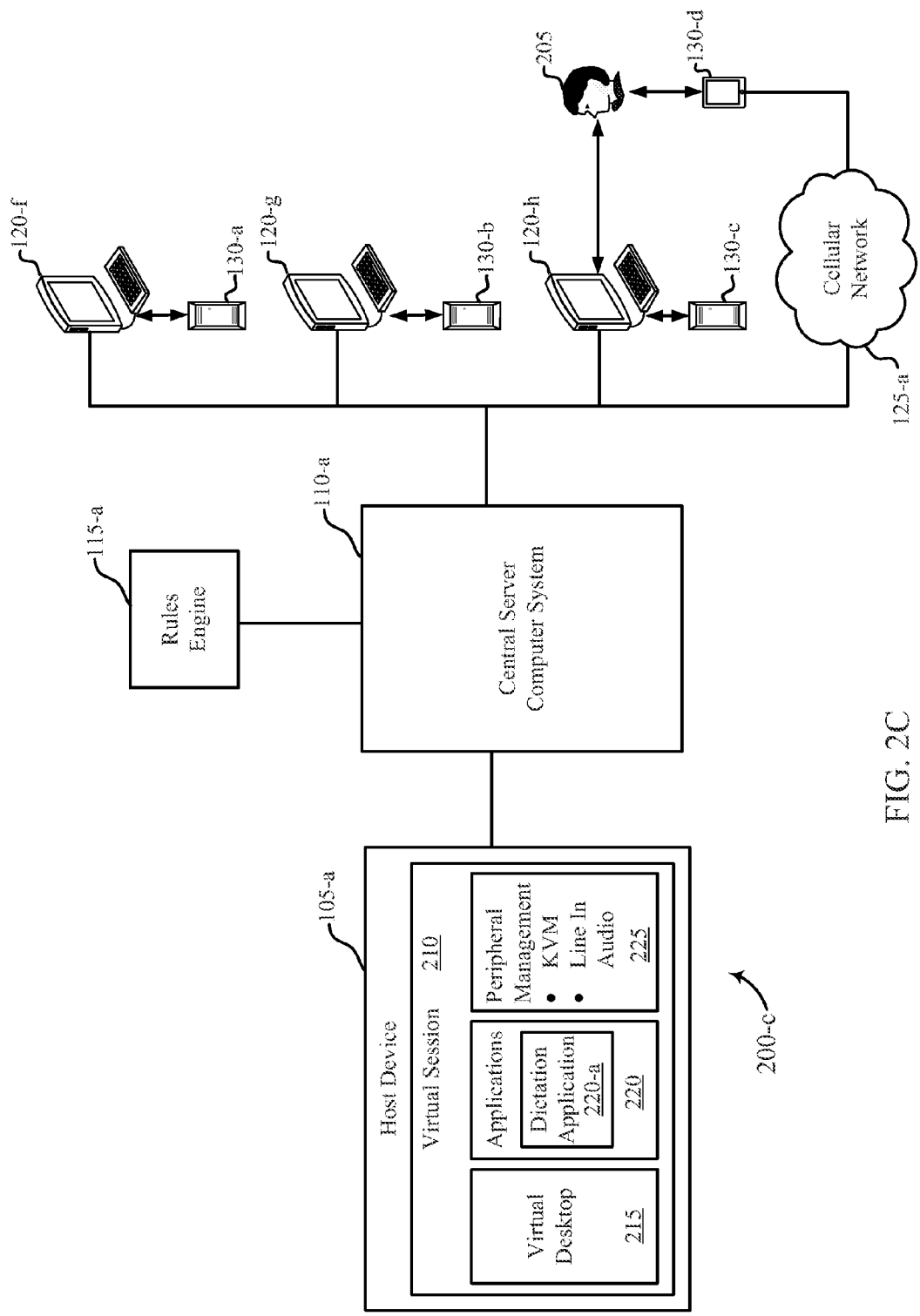

FIGS. 2A-2C illustrate a system 200 including a host device 105-a, a central server computer system 110-a, a rules engine 115-a, terminal devices 120, and peripheral devices 130. A number of the terminal devices 120 may be connected to local access card reader peripheral devices 130. In the present example, the central server computer system 110-a may coordinate a collaboration of heterogeneous devices during a virtual session executed at the remote host device 105-a and associated with a user 205. The system 200 of FIGS. 2A-2C may be an example of the system 100 of FIG. 1. Thus, the host device 105-a, central server computer system 110-a, rules engine 115-a, terminal devices 120, and peripheral devices 130 of FIGS. 2A-2C may be examples of the host device 105, central server computer system 110, rules engine 115, terminal devices 120, and peripheral devices 130 described above with reference to FIG. 1.

At FIG. 2A, the host device 105-a may execute and host a virtual session 210 on behalf of user 205 logged in to workstation 120-f. The virtual session 210 may include a virtual desktop 215 for the user, a dictation application 220, and other applications 225 executed at the host device 105-a for use by the user 205. The virtual session 210 may further include peripheral management applications 225 for managing peripheral devices associated with the virtual session 210. The central server computer system 110-a may communicate with the host device 105-a to maintain the virtual session 210 active at the host device 105-a on behalf of the user 205. The central server computer system 110-a may receive data for the virtual session 210 and forward the data to terminal devices 120 and peripheral devices 130 associated with the virtual session 210. Additionally, the central server computer system 110-a may forward data for the virtual session 210 from the terminal devices 120 and peripheral devices 130 to the host device 105-a.

In the present example of FIG. 2A, the virtual session 210 may begin with only workstation terminal device 120-f associated with the virtual session 210. Accordingly, the peripheral management application 225 of the virtual session 210 may manage KVM data transmitted to and from the workstation terminal device 120-f to provide the user interface of the virtual session 210 to the user 205. However, the user 205 may wish to utilize the voice recognition functionality of the dictation application 220 for the virtual session 210 by the host device 105-a, and workstation terminal device 120-f may not have an installed microphone to capture the voice of the user 205. However, the user 205 may have access to smartphone peripheral device 130-d which may have a microphone. Accordingly, it may be determined that the microphone feed from the smartphone peripheral device 130-d may be provided as a peripheral line in audio feed to the host device 105-a for use with at least the dictation application 220 of the virtual session 210.

Accordingly, the user 205 may issue a request to the central server computer system 110-a using workstation 120-f or smartphone peripheral device 130-d to associate the microphone feed from the smartphone peripheral device 130-d as a peripheral line-in audio feed to the virtual session 210. In response to receiving this request, the central server computer system 110-a may establish contact with smartphone peripheral device 130-d and dynamically associate the smartphone 130-d with the virtual session 210.

In the present example, the central server computer system 110-a may communicate with the terminal devices 120 over a local area network, and with smartphone peripheral device 130-d over cellular network 125-a. As such, the central server computer system 110-a may initiate a call or network connection to smartphone peripheral device 130-d over the cellular network 125-a. In the case of a call, the user 205 may answer the call, thereby opening a channel from the microphone feed of the smartphone peripheral device 130-d to the central server computer system 110-a. The central server computer system 110-a may then forward the microphone feed received through the call with smartphone peripheral device 130-d to the host device 105-a as peripheral input to the virtual session 210.

In this way, the user 205 may access the dictation application 220 running on the host device as part of the virtual session 210 through the user's smartphone peripheral device 130-d. Through the dynamically updated forwarding that occurs at the session data switching module 235 between host device 105-a, workstation 120-f, and smartphone 130-d, the user 205 may control certain elements of the virtual session 210 by dictating spoken commands into smartphone 130-d, and then view the results of these spoken commands on workstation 120-f. The central server computer system 110-a and host device 105-a may communicate such that the virtual session 210 perceives the line-in feed from the smartphone peripheral device 130-d as originating from a microphone locally connected to the host device 105-a. In certain examples, the microphone feed may be forwarded between the smartphone peripheral device 130-d, the central server computer system 110-a, and the host device 105-a as packets of data, but the host device 105-a may convert the received packets of data into a stream of sampled audio bits for input into the virtual session 210 as though the audio bits originated from a local audio card at the host device 105-a.

In certain examples, the central server computer system 110-a may authenticate the user 205 at smartphone peripheral device 130-d prior to associating smartphone peripheral device 130-d with the virtual session 210 or forwarding the microphone feed from the smartphone peripheral device 130-d to the host device 105-a. For example, after the user 205 requests to add the microphone feed from smartphone peripheral device 130-d as input to the virtual session 210 and the user 205 answers the call from the central server computer system 110-a on smartphone peripheral device 130-d, the central server computer system 110-a may prompt the user 205 to enter a PIN, submit a voice print, or provide another type of authentication credential for verification by the central server computer system 110-a through the call. In certain examples, the central server computer system 110-a may not associate smartphone peripheral device 130-d with the virtual session or route peripheral data for the virtual session 210 between smartphone peripheral device 130-d and host device 105-a unless the central server computer system 110-a can verify that smartphone peripheral device 130-d is operated by the same user 205 that is associated with the virtual session 210.

At FIG. 2B, the user 205 may have disconnected from workstation terminal device 120-f and be in the process of migrating over to workstation terminal device 120-h at a different location. When the central server computer system 110-a discovers or infers that the user 205 has logged off of workstation terminal device 120-f, the central server computer system 110-a may dynamically update its switching and forwarding functionality such that no more data for the virtual session 210 may be forwarded between the host device 105-a and workstation terminal device 120-f. However, the central server computer system 110-a may maintain the call with smartphone peripheral device 130-d and continue to provide the microphone feed from smartphone peripheral device 130-d as auxiliary input data to the virtual session 210. Thus, the user 205 may continue to make dictation commands or provide data for the virtual session 210 while the user 205 migrates between workstation terminal devices 120. In one example, the user 205 may be dictating a letter to a word processing application hosted at the host device 105-a as part of the virtual session 210, log off of workstation terminal device 120-f, and continue dictating the letter as the user 205 migrates to workstation terminal device 120-h.

As the user 205 approaches workstation terminal device 120-h, the user 205 may provide authentication credentials to workstation terminal device 120-h by tapping a proximity card 240 to an access card reader peripheral device 130 associated with workstation terminal device 120-h. Additionally or alternatively, the user 205 may provide authentication credentials to workstation terminal device 120-h in a different way. Workstation terminal device 120-h may forward the authentication credentials received from the user 205 to the central server computer system 110-a for authentication.

At FIG. 2C, once the central server computer system 110-a has authenticated the user 205 at workstation terminal device 120-h, central server computer system 110-a may update its switching and forwarding functionality to forward virtual desktop 215 and other session data related to the virtual session 210 between workstation terminal device 120-h and the host device 105-a. The central server computer system 110-a may also continue forwarding the microphone feed from smartphone peripheral device 130-d as peripheral audio input to the virtual session 210 as long as the virtual session 210 and the call to the smartphone peripheral device 130-d are active.

While the example of FIGS. 2A-2C has been explained in terms of the dynamic addition of a microphone feed from a smartphone peripheral device 130-*d* as peripheral input to a virtual session 210, these same principles may be applied to providing peripheral output from the virtual session 210 to a peripheral device 130 over a network. For example, a sound or video stream may be sent to smartphone peripheral device 130-*d* or another auxiliary peripheral device 130 in conjunction with a hosted virtual session 210. The auxiliary stream may be maintained even while the user 205 moves between terminal devices 120, according to the principles described above. Additionally, in certain examples multiple auxiliary input/output streams or events may be forwarded between host device 105-*a* and multiple peripheral devices 130 by the central server computer system 110-*a*. In certain examples, streams of peripheral data may be mirrored and/or divided across the peripheral devices 130.

Figure 3:
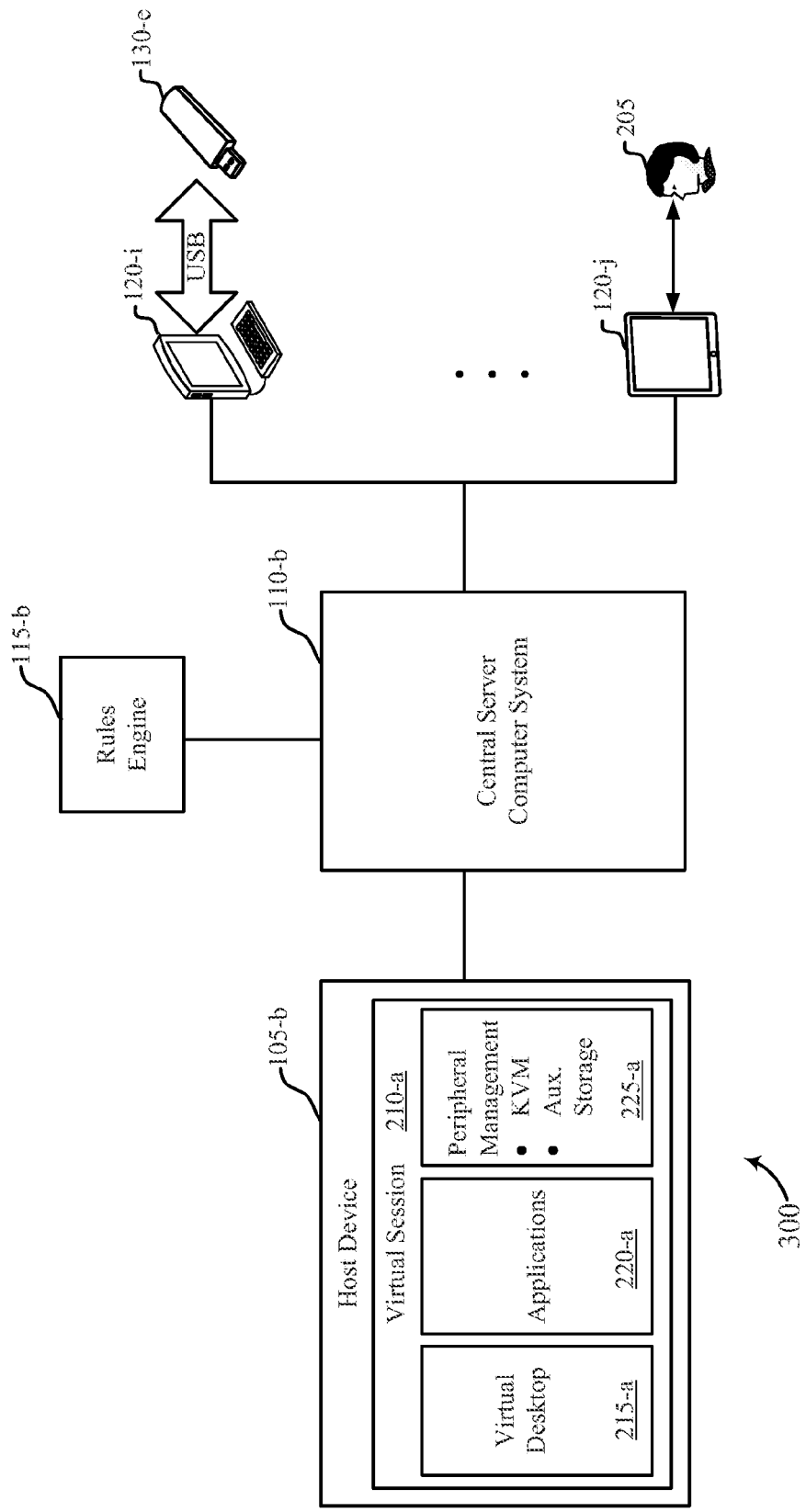
FIG. 3 is a diagram of an example system including components configured according to various embodiments of the invention.

FIG. 3 illustrates a system 300 including a host device 105-*b*, a central server computer system 110-*b*, a rules engine 115-*b*, terminal devices 120, and a Universal Serial Bus (USB) peripheral storage device 130-*e*. The central server computer system 110-*b* may coordinate a collaboration of heterogeneous devices during a virtual session 210-*a* executed at the remote host device 105-*b* and associated with a user 205. The system 300 of FIG. 3 may be an example of one or more of the systems 100, 200 described above with reference to previous Figures. Thus, the host device 105-*b*, central server computer system 110-*b*, rules engine 115-*b*, terminal devices 120, and peripheral devices 130 of FIG. 3 may be examples of corresponding components in earlier Figures.

In the example of FIG. 3, the user 205 may use a portable tablet terminal device 120-*j* to access the KVM virtual desktop 215-*a* of the virtual session 210-*a* through the host device 105-*b* and the central server computer system 110-*b*, according to the principles given above. However, the user 205 may wish to access data stored on the USB peripheral storage device 130-*e*, which may not be supported by or convenient to use with the portable tablet terminal device 120-*j*. Nevertheless, the user 205 may connect the USB peripheral storage device 130-*e* to workstation terminal device 120-*i* and issue a request to central server computer system 110-*b* to associate the USB peripheral storage device 130-*e* connected to terminal device 120-*i* with the user's virtual session 210-*a*.

In response to the request, the central server computer system 110-*b* may establish communication with the USB peripheral storage device 130-*e* through terminal device 120-*i*. Terminal device 120-*i* may act as a local host to the USB peripheral storage device 130-*e* and communicate with the central server computer system 110-*b* over a network to control the USB peripheral storage device 130-*e* and transmit data and instructions between the central server computer system 110-*b* and the USB peripheral storage device 130-*e*.

The central server computer system 110-*b* may communicate with the host device 105-*b* to forward the peripheral data for and from the USB peripheral storage device 130-*e* between the host device 105-*b* and the terminal device 120-*i*. The host device 105-*b* may set up an interface for peripheral data such that the resources of the USB peripheral storage device 130-*e* appear as a local storage device to the virtual session 210-*a*. Thus, the virtual session 210-*a* may interact with the interface to read, write, and modify data stored by the USB peripheral storage device 130-*e* as though the USB peripheral storage device 130-*e* were plugged directly into the host device 105-*b*.

Figure 4:
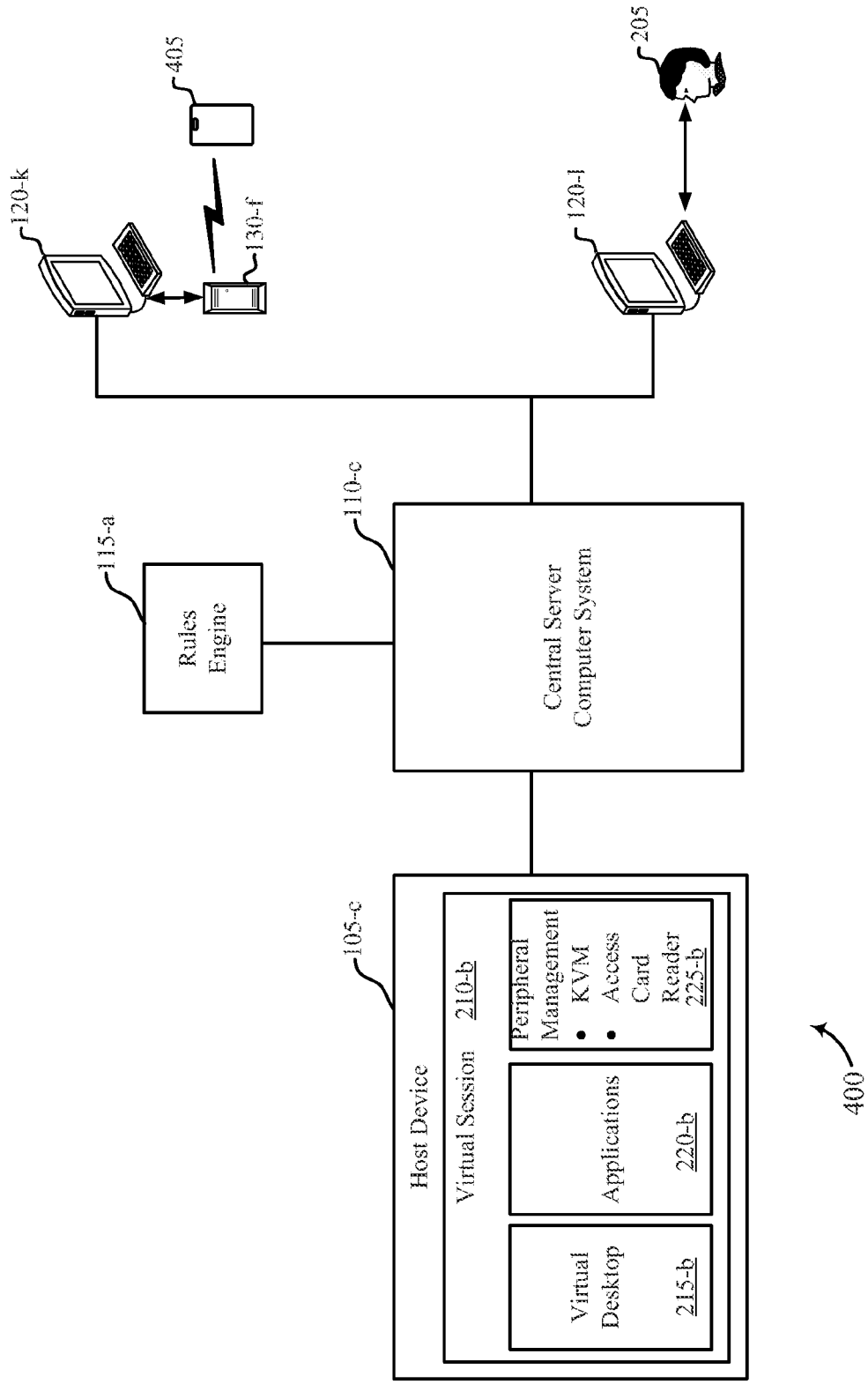
FIG. 4 is a diagram of an example system including components configured according to various embodiments of the invention.

FIG. 4 illustrates a system 400 including a host device 105-*c*, a central server computer system 110-*c*, a rules engine 115-*c*, terminal devices 120, and an access card reader peripheral device 130-*f*. The central server computer system 110-*c* may coordinate a collaboration of heterogeneous devices during a virtual session 210-*b* executed at the remote host device 105-*c* and associated with a user 205. The system 400 of FIG. 4 may be an example of one or more of the systems 100, 200, 300 described above with reference to previous Figures. Thus, the host device 105-*c*, central server computer system 110-*c*, rules engine 115-*c*, terminal devices 120, and peripheral device 130 of FIG. 4 may be examples of corresponding components in earlier Figures.

In the example of FIG. 4, the user 205 may use workstation terminal device 120-*h* to access the KVM virtual desktop 215-*b* of the virtual session 210-*b* through the host device 105-*c* and the central server computer system 110-*c*, according to the principles of this disclosure. One or more of the applications 220-*b* running on the virtual session 210-*b* may be configured to take certain actions in response to the receipt of an access token credential from an access card reader peripheral device 130-*f*. But the workstation terminal device 120-*l* currently attached to the user 205 may not be connected to a local access card reader peripheral device 130-*f*. Nevertheless, workstation terminal device 120-*k* may have a locally connected access card reader peripheral device 130-*f*. Thus, the user 205 may issue a request to central server computer system 110-*c* to associate the access card reader peripheral device 130-*f* connected to workstation terminal device 120-*k* with the user's virtual session 210-*b*.

In response to the request, the central server computer system 110-*c* may establish communication with the access card reader peripheral device 130-*f* through terminal device 120-*k*. Terminal device 120-*k* may act as a local host to the access card reader peripheral device 130-*f* and communicate with the central server computer system 110-*c* over a network to forward an access token event to the central server computer system 110-*c* whenever a valid access card 405 is tapped to the access card reader peripheral device 130-*f*.

The central server computer system 110-*c* may communicate with the host device 105-*c* to forward the access token events received from the terminal device 120-*k* to the host device 105-*c*. The host device 105-*c* may set up an interface for peripheral data such that the receipt of an access card token at the host device 105-*c* from the central server computer system 110-*c* appears to the virtual session 210-*b* as though the same access card 405 were tapped to an access card reader peripheral device locally connected to the host device 105-*c*. Thus, the applications 220-*b* running on the virtual session 210-*b* may interact with the access card reader peripheral device 130-*f* as though the access card reader peripheral device 130-*f* were plugged directly into the host device 105-*c*.

Figure 5:
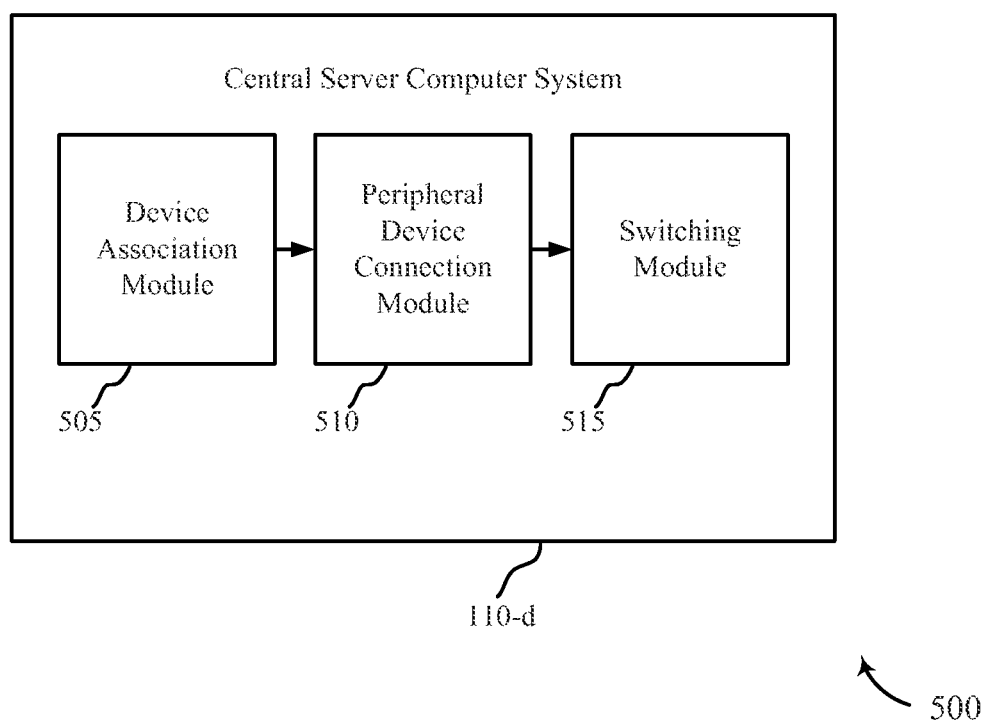
FIG. 5 is a block diagram of an example central server computer system according to various embodiments of the invention.

FIG. 5 is a block diagram 500 of an example central server computer system 110-*d* according to the principles described herein. The central server computer system 110-*d* may be an example of one or more of the central server computer systems 110 described above with reference to the previous Figures. The central server computer system 110-*d* of the present example may be used to initiate, coordinate, maintain, and adapt collaboration activities among terminal devices (e.g., terminal devices 120 of the previous Figures), peripheral devices (e.g., peripheral devices 130 of the previous Figures) in a network in conjunction with a remotely hosted virtual session at a host device (e.g., host device 105 of the previous Figures).

The central server computer system 110-*d* of the present example may include a device association module 505, a peripheral device connection module 510, and a switching module 515. Each of these components may be in communication, directly or indirectly. Each module 505, 510, 515 may be implemented by dedicated hardware, processor hardware executing software, software stored on a physical computer-readable medium or device, or combinations thereof. In certain examples, the same hardware may implement more than one of the modules 505, 510, 515 of FIG. 5. Additionally or alternatively, the functionality of the modules 505, 510, 515 of the central server computer system 110-*d* may be distributed across a system of interrelated hardware devices.

The device association module 505 may associate terminal devices with virtual sessions. For example, the device association module 505 may identify a terminal device for the virtual session and instruct the switching module 515 to forward data relating to the primary user interface (e.g., a virtual desktop) for the virtual session between the terminal device and the host device of the virtual session.

The device association module 505 may be further configured to associate a peripheral device with a virtual session hosted by a host device. The association of a peripheral device with a virtual session may be in response to a request received at the central server computer system 110-*d* (e.g., from a terminal device associated with the virtual session). The terminal device association module 505 may further associate an input or output feed of peripheral data from the associated peripheral device with the virtual session at the request of a user. In certain examples, the terminal device association module 505 may not associate a terminal device or peripheral device with the virtual session without authenticating the user of the virtual session at that terminal device or peripheral device.

The device connection module 510 may be configured to establish a connection between the central server computer system 110-*d* and the terminal device(s) and/or peripheral device(s) associated with a virtual session.

The switching module 515 may selectively forward user interface data associated with the virtual session between the host device and the terminal device associated with that session. For example, the user interface data may include KVM or other remote desktop user interface components associated with the virtual session. The switching module 515 may be further configured to forward peripheral data between the peripheral device associated with the virtual session and the host device of the virtual session. The peripheral data may be forwarded such that the virtual session perceives the peripheral device as though the source of the received peripheral data is a peripheral device locally connected to the host device.

The forwarding rules of the switching module 515 may be dynamically updated based on the state of the virtual session. For example, the forwarding rules may be changed as different terminal or peripheral devices become associated with the virtual session or disassociated with the virtual session. Additionally or alternatively, the forwarding rules may change as different types of session data are exchanged, as different session applications are executed, or as user preferences change.

Figure 6:
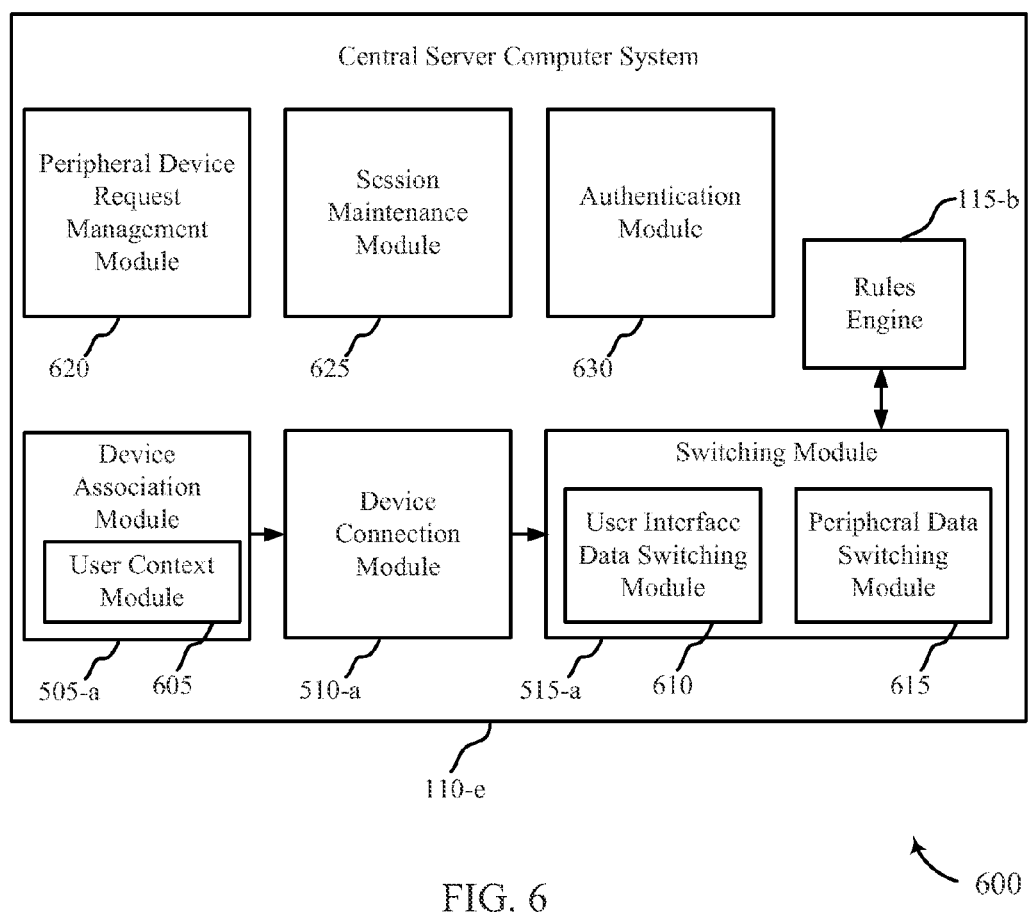
FIG. 6 is a block diagram of an example central server computer system according to various embodiments of the invention.

FIG. 6 is a block diagram 600 of an example central server computer system 110-*e* according to the principles described herein. The central server computer system 110-*e* may be an example of one or more of the central server computer systems 110 described above with reference to the previous Figures. The central server computer system 110-*e* of the present example may be used to initiate, coordinate, maintain, and adapt collaboration activities among terminal devices (e.g., terminal devices 120 of the previous Figures) and peripheral devices (e.g., peripheral devices 130 of the previous Figures) in a network in conjunction with a remotely hosted virtual session at a host device (e.g., host device 105 of the previous Figures).

The central server computer system 110-*e* of the present example may include a device association module 505-*a*, a peripheral device connection module 510-*a*, a switching module 515-*a*, a peripheral device request management module 620, a session maintenance module 625, an authentication module 630, and a rules engine module 115-*b*. Each of these components may be in communication, directly or indirectly. Each module may be implemented by dedicated hardware, processor hardware executing software, software stored on a physical computer-readable medium or device, or combinations thereof. In certain examples, the same hardware may implement more than one of the modules of FIG. 6. Additionally or alternatively, the functionality of the modules of the central server computer system 110-*e* may be distributed across a system of interrelated hardware devices.

As with the previous example, the device association module 505-*a* may associate a terminal device and at least one peripheral device with a virtual session running on a remote host device. The device connection module 510-*a* may be configured to establish a connection between the central server computer system 110-*e* and the terminal device(s) and/or peripheral device(s) associated with the virtual session, and the switching module 515-*a* may selectively forward, over a network, user interface data associated with the virtual session between the host device and the terminal device associated with that session, and peripheral data between the host device and the peripheral device(s) associated with that virtual session. The user interface data may be at least partially based on the peripheral data.

In the present example, the device association module 505-*a* may include a user context module 605 configured to detect a change in a user context for a user of a virtual session and update a change in the terminal or peripheral devices associated with that virtual session based on the change. The user context information for the user may include the user's location, status, activities, permissions, events, authentication credentials, a time of day, a status of a timer or sensor, or other factor that may be relevant to the state of the user.

For example, the user context module 605 may be configured to detect a movement of the user from a first terminal device to a second terminal device coupled with the central server computer system. The user context module 605 may accordingly update the virtual session of the user to associate the virtual session with the second terminal device and disassociate the virtual session with from the first virtual session.

The user context module 605 may detect this move based on at least a logout event at the first terminal device and a login event at the second terminal device. Based on the logout event and inferred or move of the user, the switching module 515-*a* may be configured to begin forwarding the user interface data associated with the virtual session between the host device and the second terminal device, and discontinue forwarding the user interface data associated with the virtual session between the host device and the first terminal device. In certain examples, the switching module 515-*a* may continue forwarding peripheral data for the virtual session between a selected peripheral device and the host device following receipt of the logout event from the first terminal device and prior to receiving the login event from the second terminal device.

In certain examples, the device association module 505-*a* may communicate with a peripheral device request management module 620 to receive and process requests from a user of the virtual session (e.g., via the terminal device associated with that virtual session) to associate a particular peripheral device with the virtual session. The switching module 515-*a* may forward the peripheral data between the selected peripheral device and the host device in response to such a request.

In certain examples, the device connection module 510-*a* may be configured to communicate at the central server computer system with a second terminal device that is locally connected to the peripheral device to establish the connection between the central server computer system and the peripheral device. Alternatively, the device connection module 510-*a* may communicate directly with the peripheral device over the network.

The switching module 515-*a* may include a user interface data switching module 610 configured to forward the user interface data between the central server computer system 110-*e* and the terminal device of the virtual session, and a peripheral data switching module 615 configured to forward the peripheral data for the virtual session between the central server computer system 110-*e* and the peripheral device(s) selected for the virtual session. In certain examples, the user interface data may be forwarded over a first network (e.g., a local area network (LAN), an intranet, etc.) and the peripheral data may be forwarded over at least a second network (e.g., a wide area network (WAN), the Internet, a cellular network, etc.).

The session maintenance module 625 may communicate with the host device to establish and maintain one or more virtual sessions on behalf of one or more users. In certain examples, the session maintenance module 625 may keep a virtual session alive at the host device even if the user of that virtual session is not currently logged into a terminal device.

The authentication module 630 may be configured to authenticate a user of a virtual session based on authentication credentials received at a terminal device or through a peripheral device.

Figure 7:
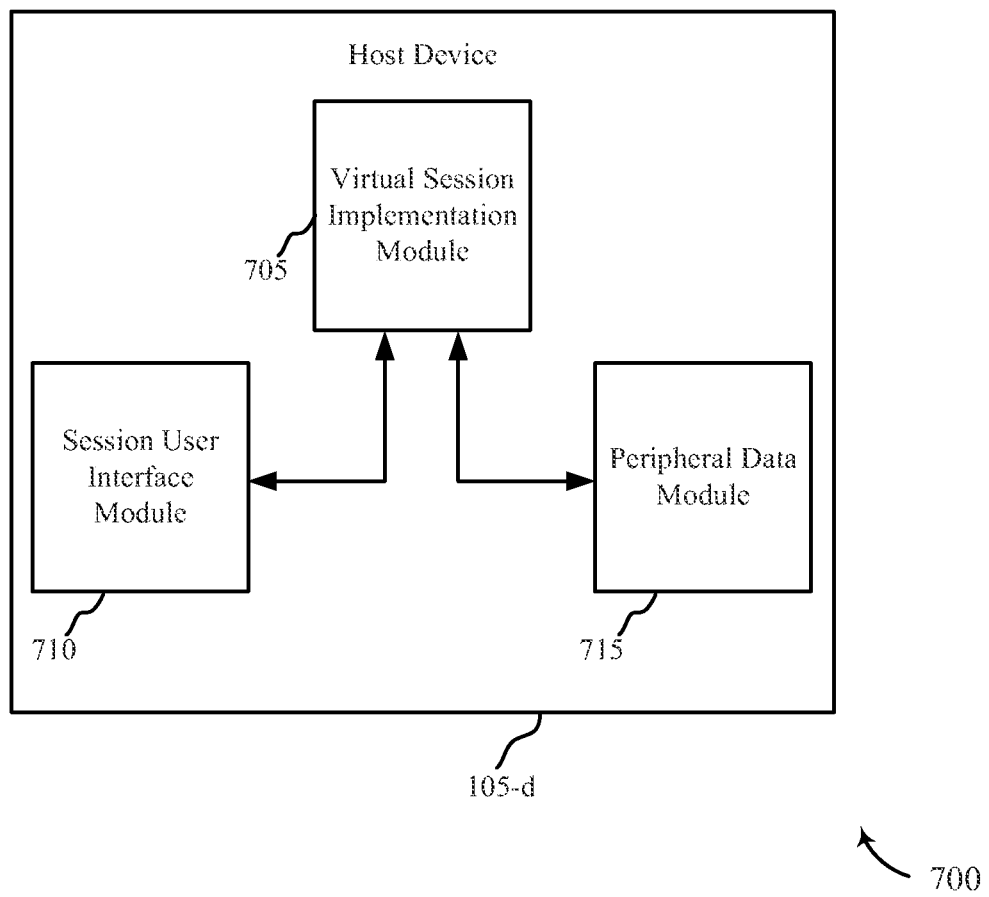
FIG. 7 is a block diagram of an example host device according to various embodiments of the invention.

FIG. 7 is a block diagram 700 of an example host device 105-*d* according to the principles described herein. The host device 105-*d* may be an example of one or more of the host devices 105 described above with reference to the previous Figures. The host device 105-*d* of the present example may include a virtual session implementation module 705, a session user interface module 710, and a peripheral data module 715. The virtual session implementation module 705 may be configured to execute an instance of a virtual session associated with a user.

Each module may be implemented by dedicated hardware, processor hardware executing software, software stored on a physical computer-readable medium or device, or combinations thereof. In certain examples, the same hardware may implement more than one of the modules of FIG. 7. Additionally or alternatively, the functionality of the modules of the host device 105-*d* may be distributed across a system of interrelated hardware devices. In certain examples, part or all of the functionality of the host device 105-*d* may be implemented by or at one of the central server computer systems described above with reference to the previous Figures.

The session user interface module 710 may be configured to communicate with a central server computer system to provide a user interface of the virtual session to the central server computer system for forwarding to a terminal device associated with the virtual session. The session user interface module 710 may also communicate with the central server computer system to receive user interface data originating from the terminal device, and provide the user interface data to the virtual session. The session user interface module 710 may create an interface between the virtual session and the central server computer system such that from the perspective of the virtual session, the user interface data is being transmitted to and received from one or more locally attached terminal devices.

The peripheral data module 715 may be configured to communicate with the central server computer system to send peripheral data of the virtual session to the central server computer system for forwarding to a peripheral device associated with the virtual session over a network (e.g., and not necessarily associated with the terminal device). The peripheral data module 715 may also communicate with the central server computer system to receive peripheral data originating from the peripheral device, and provide the peripheral data to the virtual session. The peripheral data module 715 may create an interface between the virtual session and the central server computer system such that from the perspective of the virtual session, the peripheral data is being transmitted to and received from one or more locally attached peripheral devices.

Figure 8:
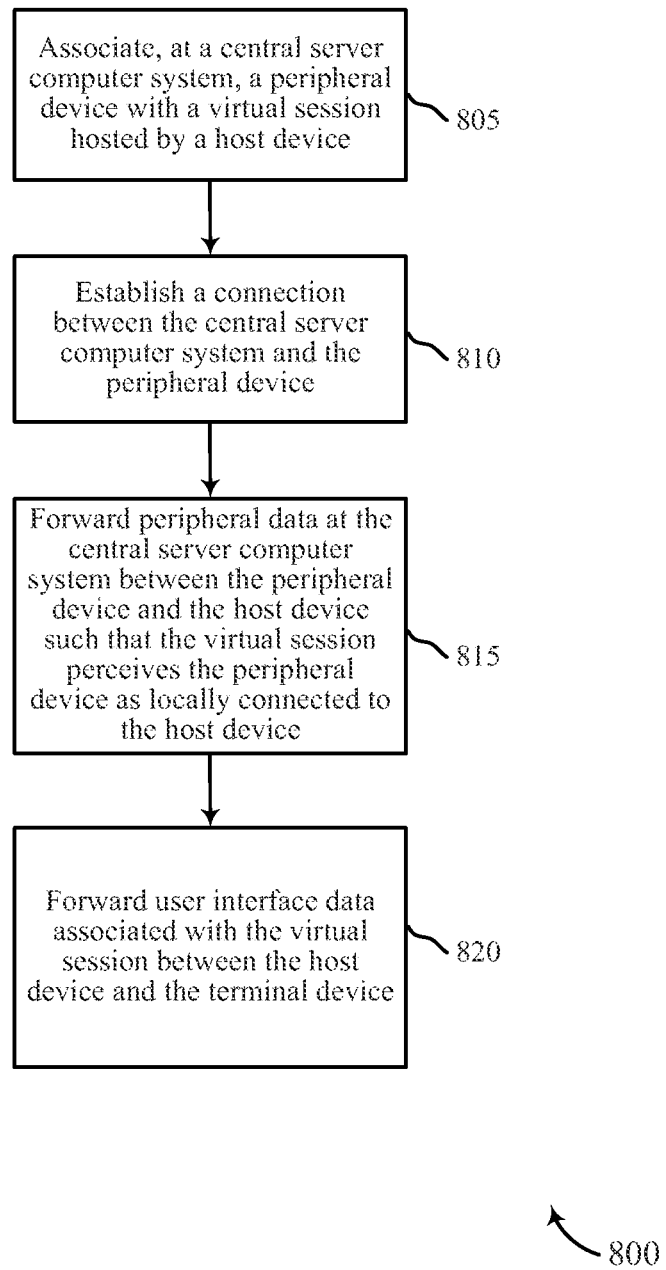
FIG. 8 is a flowchart diagram of an example method of managing virtual sessions according to various embodiments of the invention.

FIG. 8 illustrates a flowchart of an example method 800 of centrally managing virtual sessions according to various embodiments of the invention. The method 800 may be performed, for example, by one or more of the central server computer systems 110 or rules engines 115 described above with reference to the previous Figures.

At block 805, a peripheral device may be associated at a central server computer system with a virtual session remotely hosted by a host device. At block 810, a connection may be established between the central server computer system and the peripheral device. At block 815, peripheral data may be forwarded at the central server computer system between the peripheral device and the host device such that the virtual session perceives the peripheral device as locally connected to the host device. At block 820, user interface data associated with the virtual session may be forwarded at the central server computer system between the host device and the terminal device.

Figure 9:
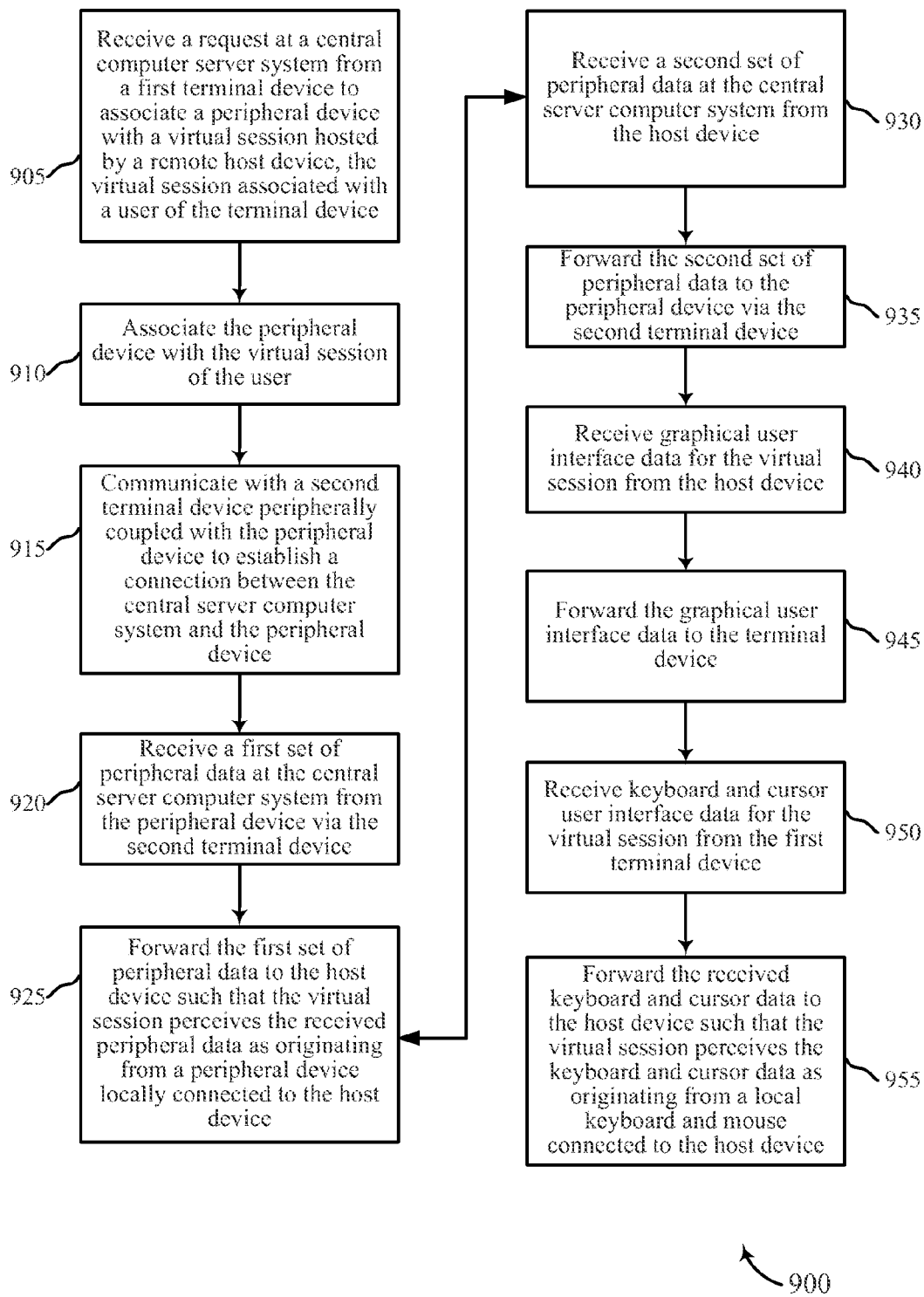
FIG. 9 is a flowchart diagram of an example method of managing virtual sessions according to various embodiments of the invention.

FIG. 9 illustrates a flowchart of an example method 900 of centrally managing virtual sessions according to various embodiments of the invention. The method 900 may be performed, for example, by one or more of the central server computer systems 110 or rules engines 115 described above with reference to the previous Figures. The method 900 of FIG. 9 may be an example of the method 800 of FIG. 8.

At block 905, a central server computer system may receive a request from a first terminal device to associate a peripheral device with a virtual session hosted by a remote host device. The virtual session may be associated with a user of the terminal device. At block 910, the peripheral device may be associated with the virtual session of the user at the central server computer system. At block 915, the central server computer system may communicate with a second terminal device peripherally coupled with the peripheral device to establish a connection between the central server computer system and the peripheral device. At block 920, a first set of peripheral data may be received at the central server computer system from the peripheral device via the second terminal device. At block 925, the central server computer system may forward the first set of peripheral data to the host device such that the virtual session perceives the received peripheral data as originating from a peripheral device locally connected to the host device.

At block 930, a second set of peripheral data may be received at the central server computer system from the host device. At block 935, the second set of peripheral data may be forwarded to the peripheral device via the second terminal device. At block 940, graphical user interface data for the virtual session may be received from the host device. At block

945, the central server computer system may forward the graphical user interface data to the terminal device. At block 950, the central server computer system may receive keyboard and cursor user interface data for the virtual session from the first terminal device. At block 955, the central server computer system may forward the received keyboard and cursor data to the host device such that the virtual session perceives the keyboard and cursor data as originating from a local keyboard and mouse connected to the host device.

Figure 10:
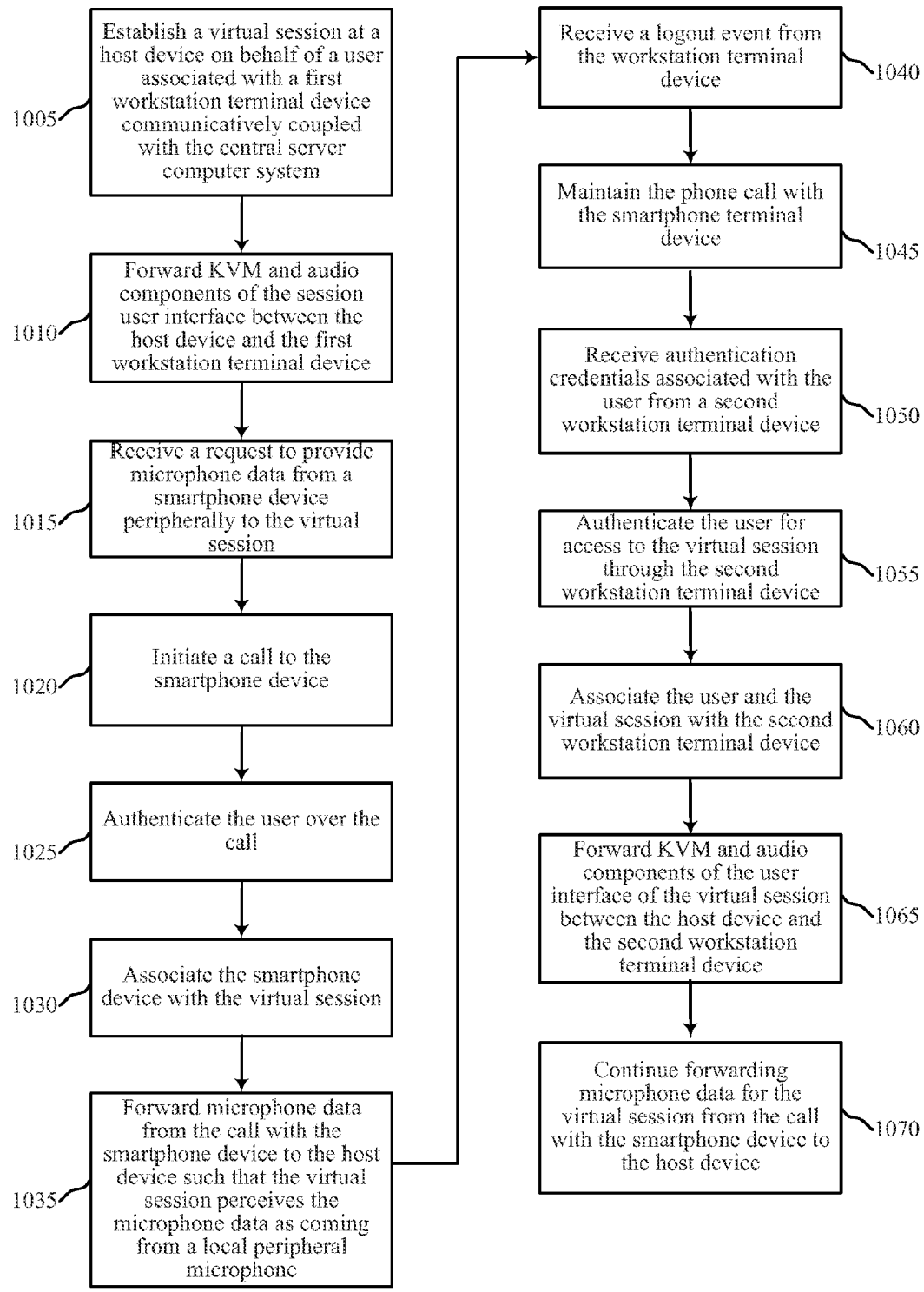
FIG. 10 is a flowchart diagram of an example method of managing virtual sessions according to various embodiments of the invention.

FIG. 10 illustrates a flowchart of an example method 1000 of centrally managing virtual sessions according to various embodiments of the invention. The method 1000 may be performed, for example, by one or more of the central server computer systems 110 or rules engines 115 described above with reference to the previous Figures. The method 1000 of FIG. 10 may be an example of the method 800 of FIG. 8 or the method 900 of FIG. 9.

At block 1005, a virtual session may be established at a host device on behalf of a user associated with a first workstation terminal device communicatively coupled with a central server computer system. At block 1010, KVM and audio components of the session user interface may be forwarded between the host device and the first workstation terminal device. At block 1015, a request to provide microphone data from a smartphone device to the virtual session may be received at the central server computer system. At block 1020, the central server computer system may initiate a telephone call to the smartphone terminal device. At block 1025, the central server computer system may authenticate the user over the call based on authentication credentials provided by the user (e.g., a PIN, voice identification, etc.). At block 1030, the smartphone terminal device may be associated with the virtual session, and at block 1035, the microphone data from the continuing call with the smartphone device may be forwarded to the host device for use as input to the virtual session such that the virtual session perceives the microphone data as coming from a local peripheral microphone.

At block 1040, a logout event may be received from the first workstation terminal device, indicating that the user has logged off of the first workstation terminal device. At block 1045, the central server computer system may maintain the phone call with the smartphone terminal device and continue forwarding the microphone data from the call to the host device for use with the virtual session. At block 1050, authentication credentials associated with the user may be received from a second workstation terminal device at the central server computer system. At block 1055, the user may be authenticated at the central server computer system for access to the virtual session through the second workstation terminal device. At block 1060, the user may be associated with the second workstation terminal device as the primary terminal device for the virtual session. At block 1065, KVM and audio components of the user interface of the virtual session may be forwarded between the host device and the second workstation terminal device. At block 1070, the central server computer system may continue forwarding microphone data for the virtual session from the call with the smartphone device to the host device for use as input to the virtual session.

Figure 11:
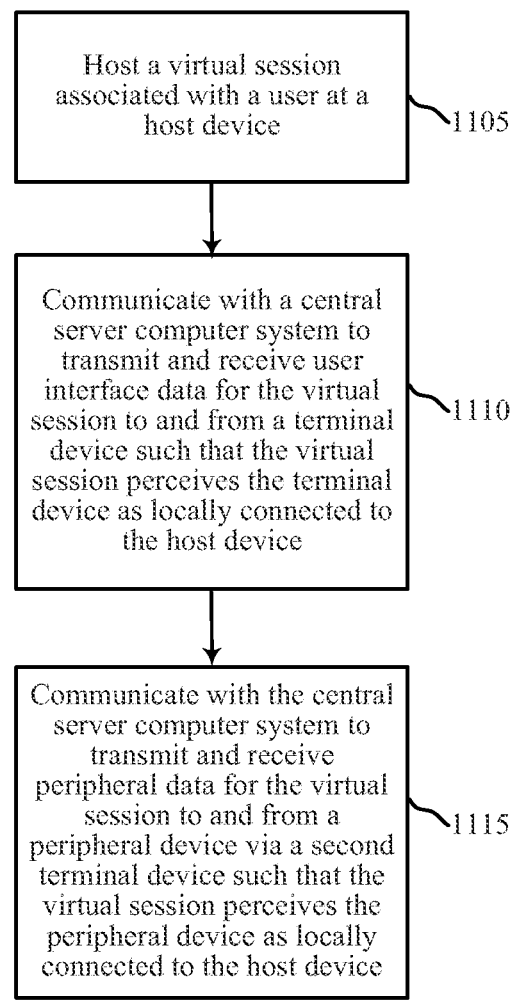
FIG. 11 is a flowchart diagram of an example method of managing virtual sessions according to various embodiments of the invention.

FIG. 11 illustrates a flowchart of an example method 1100 of centrally managing virtual sessions according to various embodiments of the invention. The method 1100 may be performed, for example, by one or more of the host devices 105 described above with reference to the previous Figures.

At block 1105, a virtual session may be hosted at the host device, and the virtual session may be associated with a user. At block 1110, the host device may communicate with a central server computer system to transmit and receive user interface data for the virtual session to and from a terminal device such that the virtual session perceives the terminal device as locally connected to the host device. At block 1115, the host device may communicate with the central server computer system to transmit and receive peripheral data for the virtual session to and from a peripheral device via a second terminal device such that the virtual session perceives the peripheral device as locally connected to the host device.

Figure 12:
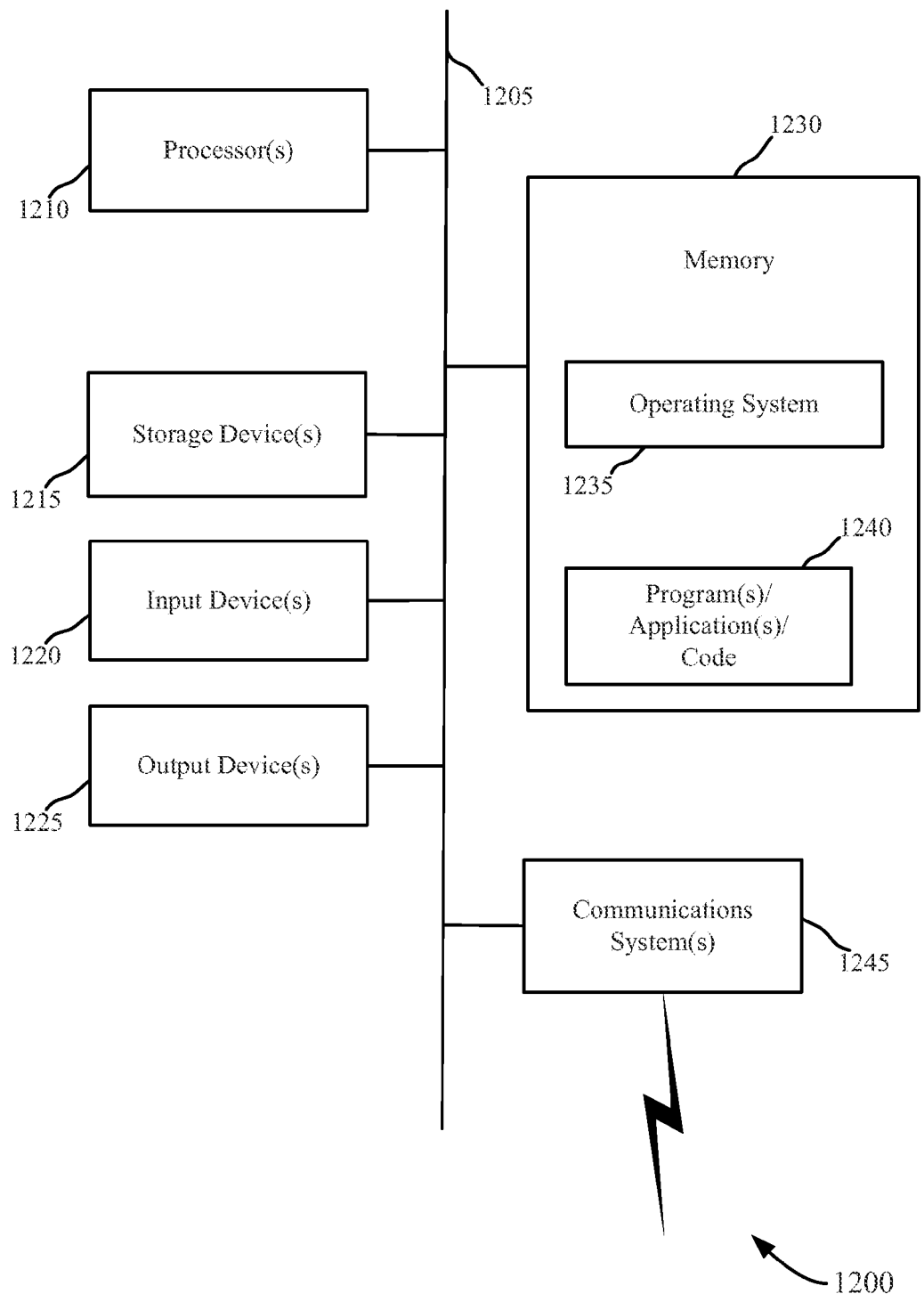
FIG. 12 is a schematic diagram that illustrates a representative device structure that may be used in various embodiments of the present invention.

A device structure 1200 that may be used for a host device 105, a central server computer system 110, a rules engine 115, a terminal device 120, or other computing devices described herein, is illustrated with the schematic diagram of FIG. 12. This drawing broadly illustrates how individual system elements of each of the aforementioned devices may be implemented, whether in a separated or more integrated manner. The exemplary structure is shown comprised of hardware elements that are electrically coupled via bus 1205, including processor(s) 1210 (which may further comprise a DSP or special-purpose processor), storage device(s) 1215, input device(s) 1220, and output device(s) 1225. The storage device(s) 1215 may be a machine-readable storage media reader connected to any machine-readable storage medium, the combination comprehensively representing remote, local, fixed, or removable storage devices or storage media for temporarily or more permanently containing computer-readable information. The communications systems interface 1245 may interface to a wired, wireless, or other type of interfacing connection that permits data to be exchanged with other devices. The communications system(s) interface 1245 may permit data to be exchanged with a network.

The structure 1200 may also include additional software elements, shown as being currently located within working memory 1230, including an operating system 1235 and other code 1240, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a SIM card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A system for managing virtual sessions, comprising:
a peripheral device configured to transmit or receive peripheral data;
a terminal device separate from the peripheral device;
a host device configured to host a virtual session associated with the terminal device; and
a central server computer system communicatively coupled with the peripheral device, the terminal device, and the host device, the central server computer system configured to:
associate the peripheral device with the virtual session hosted by a host device;
establish a connection between the central server computer system and the peripheral device;
forward peripheral data between the peripheral device and the host device such that the virtual session perceives the peripheral device as locally connected to the host device; and
forward user interface data associated with the virtual session between the host device and the terminal device.

2. The system of claim 1, wherein the terminal device comprises a first terminal device and the central server computer system is further configured to:
detect a movement of a user from the first terminal device to a second terminal device communicatively coupled with the central server computer system; and
begin forwarding the user interface data associated with the virtual session between the host device and the second terminal device based on the detected movement of the user.

3. The system of claim 2, wherein the central server computer system is further configured to:
discontinue the forwarding of user interface data associated with the virtual session between the host device and the first terminal device based on a logout event received from the first terminal device.

4. The system of claim 3, wherein the central server computer system is further configured to:
continue forwarding the peripheral data between the peripheral device and the host device following the logout event and prior to receiving a login event from the second terminal device.

5. A method of managing virtual sessions, comprising:
associating, at a central server computer system, a peripheral device with a virtual session hosted by a host device, wherein the virtual session is further associated with a terminal device communicatively coupled with the central server computer system, and wherein the peripheral device is separate from the terminal device;
establishing a connection between the central server computer system and the peripheral device;
forwarding peripheral data at the central server computer system between the peripheral device and the host device such that the virtual session perceives the peripheral device as locally connected to the host device; and
forwarding user interface data associated with the virtual session between the host device and the terminal device.

6. The method of claim 5, wherein the terminal device comprises a first terminal device, the method further comprising:
detecting a movement of a user from the first terminal device to a second terminal device communicatively coupled with the central server computer system; and
forwarding the user interface data associated with the virtual session between the host device and the second terminal device.

7. The method of claim 6, further comprising:
discontinuing the forwarding of user interface data associated with the virtual session between the host device and the first terminal device based on a logout event received from the first terminal device.

8. The method of claim 7, further comprising:
continuing to forward the peripheral data between the peripheral device and the host device following the logout event and prior to receiving a login event from the second terminal device.

9. The method of claim 5, further comprising:
receiving a request at the central server computer system to associate the peripheral device with the virtual session;
wherein the forwarding of the peripheral data between the peripheral device and the host device occurs in response to the request.

10. The method of claim 9, wherein the request is received at the central server computer system from the terminal device.

11. The method of claim 5, wherein:
the forwarding the user interface data associated with the virtual session between the central server computer system and the terminal device occurs over a first network; and
the forwarding the peripheral data between the central server computer system and the peripheral device occurs over at least a second network.

12. The method of claim 5, further comprising:
authenticating a user of the peripheral device at the central server computer system;
wherein the forwarding of the peripheral data between the peripheral device and the host device occurs in response to the authenticating.

13. The method of claim 5, wherein the establishing the connection between the central server computer system and the peripheral device comprises:
communicating at the central server computer system with a second terminal device comprising a local connection to the peripheral device.

14. The method of claim 5, wherein the user interface data is at least partially based on the peripheral data.

15. A central server computer system, comprising:
a processor communicatively coupled with a memory, wherein the processor is configured to execute computer-readable program code stored by the memory to:
associate a peripheral device with a virtual session hosted by a host device, wherein the virtual session is further associated with a terminal device communicatively coupled with the central server computer system, and wherein the peripheral device is separate from the terminal device;
establish a connection between the central server computer system and the peripheral device; and
forward peripheral data between the peripheral device and the host device, such that the virtual session perceives the peripheral device as locally connected to the host device, and forward user interface data associated with the virtual session between the host device and the terminal device.

16. The central server computer system of claim 15, wherein the terminal device comprises a first terminal device and the computer-readable program code is configured to cause the processor to:
detect a movement of a user from the first terminal device to a second terminal device communicatively coupled with the central server computer system; and
begin forwarding the user interface data associated with the virtual session between the host device and the second terminal device based on the detected movement of the user.

17. The central server computer system of claim 16, wherein the computer-readable program code is further configured to cause the processor to:
discontinue the forwarding of user interface data associated with the virtual session between the host device and the first terminal device based on a logout event received from the first terminal device.

18. The central server computer system of claim 17, wherein the computer-readable program code is further configured to cause the processor to:
continue forwarding the peripheral data between the peripheral device and the host device following the logout event and prior to receiving a login event from the second terminal device.

19. The central server computer system of claim 15, wherein:
the computer-readable program code is further configured to cause the processor to receive a request to associate the peripheral device with the virtual session; and
the forwarding of the peripheral data between the peripheral device and the host device occurs in response to the request.

20. The central server computer system of claim 19, wherein the request is received from the terminal device.

21. The central server computer system of claim 15, wherein the computer-readable program code is further configured to cause the processor to:
forward the user interface data associated with the virtual session over a first network; and
forward the peripheral data between the central server computer system and the peripheral device over at least a second network.

22. The central server computer system of claim 15, wherein the computer-readable program code is further configured to cause the processor to:
authenticate a user of the peripheral device at the central server computer system;
wherein the forwarding of the peripheral data between the peripheral device and the host device occurs in response to the authenticating.

23. The central server computer system of claim 15, wherein the computer-readable program code is further configured to cause the processor to:
communicate at the central server computer system with a second terminal device comprising a local connection to the peripheral device to establish the connection between the central server computer system and the peripheral device.

24. The central server computer system of claim 15, wherein the user interface data is at least partially based on the peripheral data.

* * * * *